United States Patent
Wu et al.

(10) Patent No.: US 12,022,523 B2
(45) Date of Patent: Jun. 25, 2024

(54) MECHANISM FOR FIRST RANDOM ACCESS MODE FALLING BACK TO SECOND RANDOM ACCESS MODE

(71) Applicant: Nokia Technologies Oy, Espoo (FI)

(72) Inventors: Chunli Wu, Beijing (CN); Benoist Sebire, Tokyo (JP); Samuli Turtinen, Ii (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 298 days.

(21) Appl. No.: 17/436,897

(22) PCT Filed: Mar. 28, 2019

(86) PCT No.: PCT/CN2019/080253
§ 371 (c)(1),
(2) Date: Sep. 7, 2021

(87) PCT Pub. No.: WO2020/191773
PCT Pub. Date: Oct. 1, 2020

(65) Prior Publication Data
US 2022/0141880 A1    May 5, 2022

(51) Int. Cl.
*H04W 74/0833*    (2024.01)
*H04W 74/00*    (2009.01)

(52) U.S. Cl.
CPC ..... *H04W 74/0833* (2013.01); *H04W 74/004* (2013.01)

(58) Field of Classification Search
CPC .......... H04W 74/0833; H04W 74/004
See application file for complete search history.

(56) References Cited

U.S. PATENT DOCUMENTS

| 9,155,107 B2 * | 10/2015 | Chen | H04W 74/006 |
| 2018/0103465 A1 * | 4/2018 | Agiwal | H04W 74/004 |

(Continued)

FOREIGN PATENT DOCUMENTS

| CN | 101651892 A | 2/2010 |
| CN | 102396281 A | 3/2012 |

(Continued)

OTHER PUBLICATIONS

Office action received for corresponding Chinese Patent Application No. 201980094846.7, dated May 17, 2023, 14 pages of office action and no page of translation available.

(Continued)

*Primary Examiner* — Afshawn M Towfighi
(74) *Attorney, Agent, or Firm* — SQUIRE PATTON BOGGS (US) LLP

(57) ABSTRACT

Embodiments of the present disclosure relate to mechanism for first random access mode falling back to second random access mode. According to embodiments of the present disclosure, the fallback to second random access mode is indicated in messageB and the user equipment only needs to monitor the messageB for the quick mode on the downlink control signal which is addressed to an identifier. The user equipment does not need to monitor the downlink control channel for the second random access mode. In this way, the user equipment is allowed to fall back to the second random access mode without further retry of the quick mode, thereby reducing overload and latency.

20 Claims, 9 Drawing Sheets

(56) References Cited

U.S. PATENT DOCUMENTS

| | | | | |
|---|---|---|---|---|
| 2020/0267773 | A1* | 8/2020 | Islam | H04W 74/0833 |
| 2022/0124828 | A1* | 4/2022 | Uchino | H04W 74/0833 |

FOREIGN PATENT DOCUMENTS

| | | |
|---|---|---|
| CN | 108282901 A | 7/2018 |
| CN | 111447644 A | 7/2020 |
| TW | 201212693 A | 3/2012 |
| TW | 201911933 A | 3/2019 |
| WO | 2018/127240 A1 | 7/2018 |
| WO | 2018/175809 A1 | 9/2018 |
| WO | 2020/149660 A1 | 7/2020 |
| WO | 2020/164076 A1 | 8/2020 |
| WO | 2020/168532 A1 | 8/2020 |

OTHER PUBLICATIONS

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

"Revision of Study on 5G Non-orthogonal Multiple Access", 3GPP TSG RAN Meeting #80, RP-181403, Agenda: 9.4.4, ZTE, Jun. 11-14, 2018, 5 pages.

"New work item: 2-step RACH for NR", 3GPP TSG RAN Meeting #82, RP-182894, Agenda: 9.1.1, ZTE Corporation, Dec. 10-13, 2018, 5 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"3rd Generation Partnership Project; Technical Specification Group Radio Access Network; NR; Medium Access Control (MAC) protocol specification (Release 15)", 3GPP TS 38.321, V15.4.0, Dec. 2018, pp. 1-77.

"2-step RACH resource assignment and fall-back operation for NR-U", 3GPP TSG-RAN WG2 Meeting #104, R2-1817192, Agenda: 11.2.1.1, Nokia, Nov. 12-16, 2018, 3 pages.

"On 2-step RACH Procedure", 3GPP TSG RAN WG1 #96, R1-1902136, Agenda: 7.2.1.2, Nokia, Feb. 25-Mar. 1, 2019, pp. 1-10.

"Considerations on 2-Step RACH Procedures", 3GPP TSG RAN WG1 Meeting #96, R1-1901627, Agenda: 7.2.1.2, ZTE, Feb. 25-Mar. 1, 2019, 11 pages.

"On Procedure for 2-step RACH", 3GPP TSG RAN WG1 Meeting #96, R1-1902748, Agenda: 7.2.1.2, OPPO, Feb. 25-Mar. 1, 2019, 4 pages.

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.

International Search Report and Written Opinion received for corresponding Patent Cooperation Treaty Application No. PCT/CN2019/080253, dated Jan. 2, 2020, 10 pages.

Tentative Rejection received for corresponding Taiwan Patent Application No. 109109859, dated Mar. 11, 2021, 10 pages of Tentative Rejection and 1 page of translation available.

Office action received for corresponding Bangladesh Patent Application No. 99/2020, dated Mar. 21, 2021, 1 page.

Office action received for corresponding Bangladesh Patent Application No. 197/2021, dated Nov. 2, 2021, 1 page.

Extended European Search Report received for corresponding European Patent Application No. 19922090.6, dated Sep. 22, 2022, 13 pages.

"Msg2 payload contents for 2-step Rach", 3GPP TSG-RAN WG2 Meeting#104, R2-1817064, Agenda: 11.2.1.1, ZTE Corporation, Nov. 12-16, 2018, 9 pages.

"Procedure for Two-step RACH", 3GPP TSG RAN WG1 #96, R1-1902242, Agenda: 7.2.1.2, Samsung, Feb. 25-Mar. 1, 2019, 4 pages.

"Discussion on 2-step RACH procedure", 3GPP TSG RAN WG1 #96, R1-1901670, Agenda: 7.2.1.2, vivo, Feb. 25-Mar. 1, 2019, 5 pages.

Argentinian Office Action issued in corresponding Argentinian Patent Application No. 20200100814 dated Oct. 12, 2023.

Chinese Office Action issued in corresponding Chinese Patent Application No. 201980094846.7 dated Dec. 6, 2023.

Chinese Office Action issued in corresponding Chinese Patent Application No. 201980094846.7 on Apr. 25, 2024.

European Office Action issued in corresponding European Patent Application No. 19 922 090.6-1215 on Apr. 22, 2024.

* cited by examiner

MECHANISM FOR FIRST RANDOM ACCESS MODE FALLING BACK TO SECOND RANDOM ACCESS MODE

RELATED APPLICATION

This application claims priority to PCT Application No. PCT/CN2019/080253, filed on 28 Mar. 2019 which is incorporated herein by reference in its entirety.

FIELD

Embodiments of the present disclosure generally relate to the field of communications and in particular, to a method, device, apparatus and computer readable storage medium for first random access mode fall back to second random access mode.

BACKGROUND

In recent communication networks, a random access channel (RACH) is shared by terminal devices to request access to networks for call set-up and burst data transmission. Since the RACH is shared, it is possible that two or more terminal devices transmit at the same time and their transmissions collide. This is known as contention. If the user equipment does not get response, it performs the random access request again. Such transmission collisions may incur undesirable failure of random access and unexpected delay in transmission.

SUMMARY

Generally, embodiments of the present disclosure relate to a method for contention resolution in a random access procedure and the corresponding communication devices. According to some aspects, there is provided the subject matter of the independent claims. Some further aspects are defined in the dependent claims.

In a first aspect, there is provided an apparatus for communications. The device comprises at least one processor; and at least one memory including computer program codes; the at least one memory and the computer program codes are configured to, with the at least one processor, cause the apparatus to transmit a first request to a further apparatus for a random access procedure in a first random access mode. The apparatus is further caused to monitor a response to the first request on a downlink control channel. The apparatus is yet caused to in response to receiving the response indicating that the first request fails, determine the first random access mode or a second random access mode for the random access procedure. The user equipment is also caused to transmit a second request to the further apparatus for the random access procedure in the determined random access mode.

In a second aspect, there is provided an apparatus for communications. The device comprises at least one processor; and at least one memory including computer program codes; the at least one memory and the computer program codes are configured to, with the at least one processor, cause the apparatus to receive a first request from a user equipment for a random access procedure in a first random access mode. The network device is also caused to in response to determining that the request fails, generate a response indicating the failure. The response further comprises information on determining the first random access mode or a second random access mode. The network device is yet caused to transmit the response to the first request on a downlink control channel.

In a third aspect, there is provided a method implemented at a user equipment. The method comprises transmitting, at the user equipment, a first request to a network device for a random access procedure in a first random access mode. The method also comprises monitoring a response to the first request on a downlink control channel. The method further comprises in response to receiving the response indicating that the first request fails, determining the first random access mode or a second random access mode for the random access procedure. The method yet comprises transmitting a second request to a network for the random access procedure in the determined random access mode.

In a fourth aspect, there is provided a method implemented at a network device. The method comprises receiving, at a network device a request from a user equipment for a random access procedure in a first random access mode. The method also comprises in response to determining that the request fails, generating a response indicating the failure. The response further comprising information on determining the first random access mode or a second random access mode. The method also comprises transmitting the response to the first request on a downlink control channel.

In a fifth aspect, there is provided an apparatus comprising means for transmitting, at a user equipment, a first request to a network device for a random access procedure in a first random access mode; means for monitoring a response to the first request on a downlink control channel; means for in response to receiving the response indicating that the first request fails, determining the first random access mode or a second random access mode for the random access procedure; means for transmitting a second request to the network device for the random access procedure, the second request comprising a second preamble for the selected RA mode.

In an sixth aspect, there is provided an apparatus comprising means for receiving, at a network device, a first request from a user equipment for a random access procedure in a first random access mode; means for in response to determining that the request fails, generating a response indicating the failure, the response further comprising information on determining the first random access mode or a second random access mode; and means for transmitting the response to the request on a downlink control channel.

In a seven aspect, there is provided a non-transitory computer readable medium comprising program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
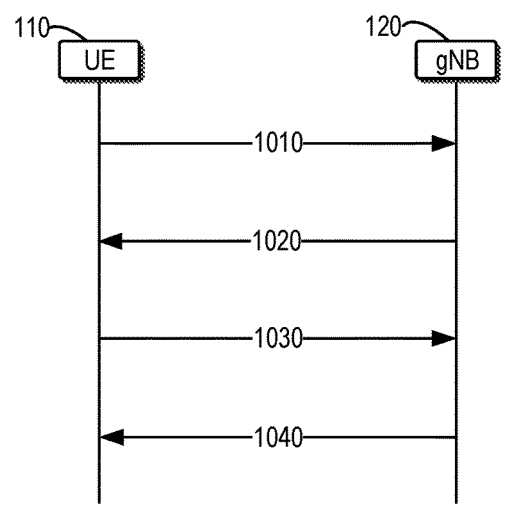
FIG. 1 illustrates a schematic diagram of a procedure of a conventional four-step RACH.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a user equipment and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a user equipment accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, several mechanisms for RACH have been proposed. For example, four-step RACH procedure has been proposed. As shown in FIG. 1, for four-step RACH procedure, a RACH transmission occasion is defined as the time-frequency resource on which a PRACH message 1 is transmitted using the configured PRACH preamble format. The user equipment (UE) 110 may transmit 1010 the RACH preamble on a PRACH resource which is mapped to a RA-RNTI and the network device may decode the preamble and obtain the RA-RNTI depending on the PRACH resource where the preamble is received. The gNB 120 may transmit 1020 message 2 which may indicate the transmission resource of message 3. In particular, the gNB 120 may transmit RA response scheduled with PDCCH addressed the RA-RNTI which is calculated from the PRACH resource (for example, time and/or frequency allocation). The UE 110 may decode the RA response and obtain the transmission resource for message3. The UE 110 may transmit 1030 a radio resource control (RRC) connection request as message3 scrambled by T-CRNTI obtained from the RA response (message2). The gNB 120 may response 1040 a contention resolution ID (containing the UL CCCH SDU in msg3) in message4 scrambled by T-CRNTI obtained from the RA response (message2) and T-CRNTI is considered as C-RNTI by the UE upon reception of the message 4.

Figure 2:
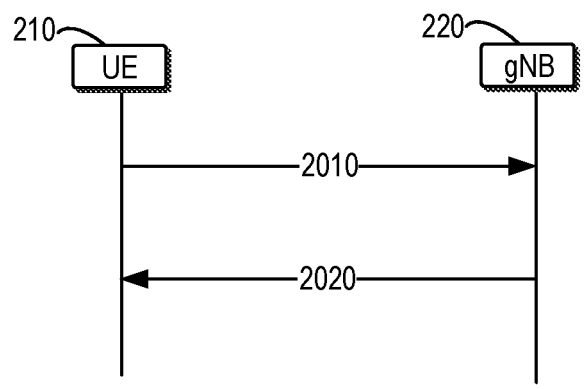
FIG. 2 illustrates a schematic diagram of a procedure of a conventional two-step RACH.

In recent studies, two-step RACH has also been proposed, which is shown in FIG. 2. The UE 210 transmits 2010 messageA or msgA to the gNB 220 and the gNB 220 transmits 2020 messageB or msgB to the UE 210. Compared to the traditional four-step RACH with preamble, RAR, message3 and contention resolution message, two-step RACH combines the transmission of preamble and the message3 payload into messageA, and combines RAR and contention resolution message into messageB. For two-step RACH, the messageA is a signal to detect the UE while the second message is for contention resolution for CBRA with a possible payload. The messageA will at least include the equivalent information which is transmitted in message3 for four-step RACH.

As a baseline, all the triggers for 4-step RACH are also applicable to 2-step RACH; however further analysis is needed on request and BFR as well as how timing advance and grants can be obtained for messageA.

The contention resolution in 2-step RACH may be performed by including a UE identifier in the first message which is echoed in the second message. Fall-back from 2-step RACH to 4-step RACH may be supported. The fallback after messageA transmission is feasible only if detection of the UE without the decoding of the payload is possible and thus relies on such support at the physical layer. If 2-step RACH is used for initial access, the parameters for 2-step RACH procedure including resources for messageA will be broadcasted.

Figure 3:
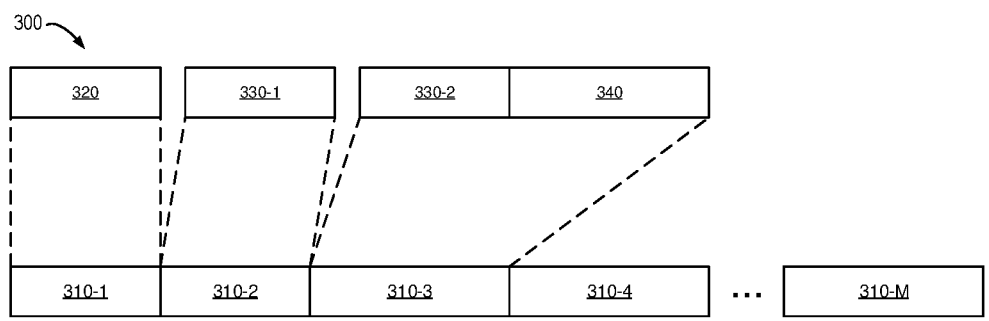
FIG. 3 illustrates a schematic diagram of medium access control (MAC) protocol data unit (PDU)

Fall back operation has been discussed, which proposed to use the RAR for 4 step RACH scheduled by PDCCH addressed to RA-RNTI to indicate fall back. FIG. 3 illustrates a schematic diagram of MAC PDU 300. The MAC PDU may comprise MAC sub PDU 310-1, 310-2, 310-3, 310-4, . . . , 310-M (where M is an integer number). As shown in FIG. 3, the MAC sub PDU 310-1 has a E/T/R/BI subheader 320, the MAC sub PDU 310-2 has a E/T/R/RAPID subheader 330-1 the MAC sub PDU 310-3 has a E/T/R/RAPID subheader 330-2 and a MAC RAR 340. As shown in FIG. 3, this requires the UE to monitor both RAR from 4-step RACH and messageB addressed to CR-RNTI (Contention Resolution RNTI) from 2-step RACH at the same time. In some embodiments, it is possible to reuse the RA-RNTI design as for 4 step RACH as well for CR-RNTI, just a different terminology as short for "RA-RNTI for msgB for 2-step RACE" to distinguish it from RA-RNTI for RAR for 4-step RACH. Not only this increases monitoring efforts but another issue is that the windows are different. If the legacy starting point and window length for RAR was kept, it would be too late to schedule RAR after the gNB decodes PUSCH since the gNB is able to decide contention resolution or fall back only after decoding the PUSCH payload.

According to embodiments of the present disclosure, the fallback to second random access mode is indicated in messageB and the user equipment only needs to monitor the messageB for the quick mode on the downlink control signal which is addressed to an identifier. The user equipment does not need to monitor the downlink control channel for the second random access mode. In this way, the user equipment is allowed to fall back to the second random access mode without further retry of the quick mode, thereby reducing overload and latency.

Figure 4:
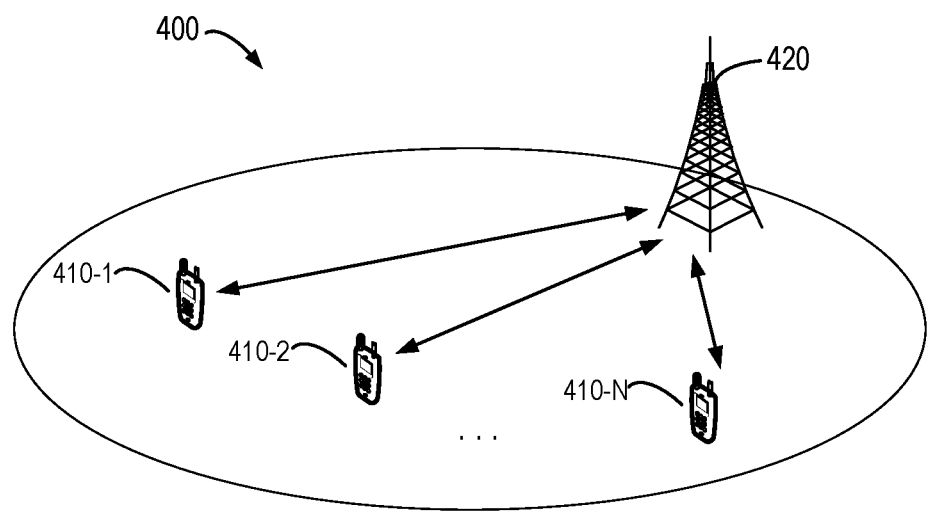
FIG. 4 illustrates a schematic diagram of a communication system according to embodiments of the present disclosure.

FIG. 4 illustrates a schematic diagram of a communication system 400 in which embodiments of the present disclosure can be implemented. The communication system 400, which is a part of a communication network, comprises terminal devices 410-1, 410-2, . . . , 410-N (collectively referred to as "terminal device(s) 410" where N is an integer number). The communication system 400 comprises one or more network devices, for example, a network device 420. It should be understood that the communication system 300 may also comprise other elements which are omitted for the purpose of clarity. It is to be understood that the numbers of terminal devices and network devices shown in FIG. 4 are given for the purpose of illustration without suggesting any limitations. The network device 420 may communicate with the terminal devices 410.

It is to be understood that the number of network devices and terminal devices is only for the purpose of illustration without suggesting any limitations. The system 400 may include any suitable number of network devices and terminal devices adapted for implementing embodiments of the present disclosure.

Communications in the communication system 400 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 5:
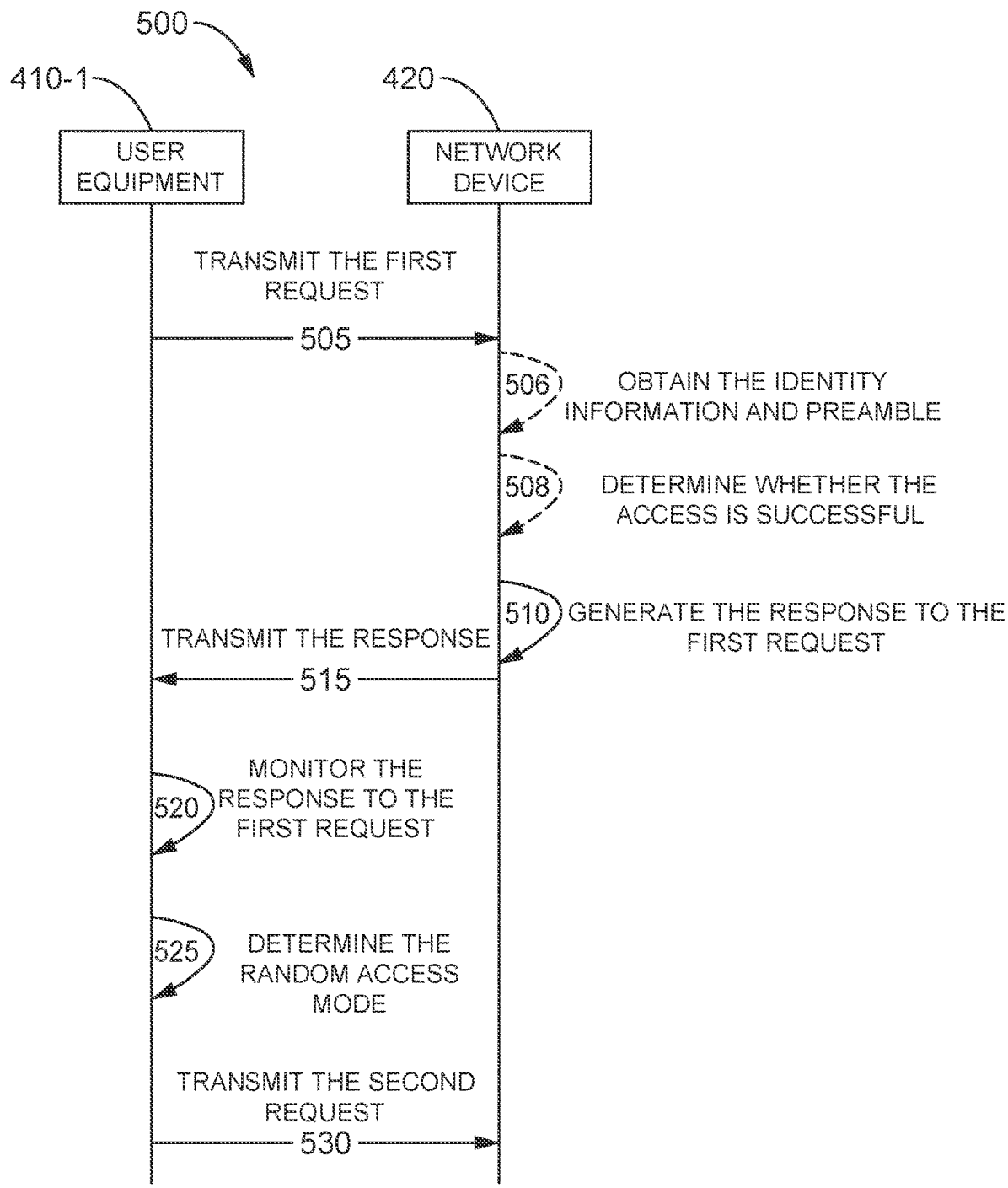
FIG. 5 illustrates a schematic diagram of interactions among devices according to embodiments of the present disclosure.

FIG. 5 illustrates a schematic diagram of interactions 500 in accordance with embodiments of the present disclosure. The interactions 500 may be implemented at any suitable devices. Only for the purpose of illustrations, the interactions 500 are described to be implemented at the user equipment 410-1 and the network device 420. Only for the purpose of illustrations, embodiments of the present disclosure are described with reference to the two-step RACH as the first random access mode and the four-step RACH as the second random access mode. It should be noted that embodiments of the present disclosure can be applied to any suitable types of RACH.

The user equipment 410-1 transmits 505 the first request (also referred to as "message A") to access the random access channel in the first random access mode to the network device 420. The first request comprises a first preamble for a first random access mode. The first preamble is transmitted on a random access channel, for example, physical random accesses channel (PRACH). In some embodiments, the user equipment 410-1 may determine the PRACH and preamble based on predetermined configurations. For example, the user equipment 410-1 may be configured with information indicating PRACHs and/or preambles used for first random access mode.

In addition, the first request comprises identity information. The identity information may be transmitted on a physical uplink shared channel (PUSCH). In other embodiments, if the user equipment 410-1 has a cell radio network temporary identifier (C-RNTI), for example, the user equipment 410-1 may be in a connected mode, the identity information may be the C-RNTI. The request may comprise C-RNTI medium access control (MAC) control element (CE).

The network device 420 may be configured with information indicating a set of predetermined preambles used for first random access mode. If the preambles belong to the set of predetermined preambles, the network device 420 may determine that the first requests are used for first random access mode.

The network device 420 may obtain 506 the identity information and the first preamble from the first request. The identity information may be used to scramble the physical downlink control channel. The first preamble indicates that the random access is in the first random access mode. The network device 420 determines 508 whether the random access procedure in the first random access mode is successful based on the capacity of the random access channel. For example, if the random access channel is overloaded, the network device 420 determines to back off the UEs before trying next attempt.

The network device 420 generate 510 the response (messageB) to the first request. In some embodiments, the response to multiple terminal devices may be multiplexed into the same data unit. For example, the network device 420 may receive another request to the random access procedure in the first random access mode. The network device may also generate another response to the other request and transmit the other response together with the response in the same PDU.

The random access response may indicate whether the random access procedure in the first random access mode is successful or not. In this way, it avoids the user equipment monitoring both CR-RNTI for first random access mode and RA-RNTI for second random access mode. The response may comprise a field to indicate whether the first random access mode is successful. The response may comprise one of: an indication of back-off (Back-off Indicator), an indication of fall back response or an indication of contention resolution, and padding. Table 1 below shows an example of the response (messageB). It should be noted that the values and numbers shown in Table 1 are only examples, not limitations.

TABLE 1

| Field | Content |
| --- | --- |
| 00 | Back-off Indicator |
| 01 | Contention Resolution |
| 10 | Response to Fall Back to Second random access mode |
| 11 | Contention Resolution or Reserved, and padding |

As shown in Table 1, the "00" in the field indicates that back-off value follows 4 bits BI. The "01" in the field indicates contention resolution for the user equipment without C-RNTI follows: 12 bits TA, 48 bits Contention resolution ID (CCCH), and 16 bits allocated C-RNTI.

The "10" in the field indicates fall back format follows: Random Access Preamble Identity (RAPID) for the first random access mode, RACH Occasion (RO) (if not unique via RNTI) for the first random access mode, and Random Access Response (RAR) payload for the second random access mode. If the RO is not uniquely indicated via the CR-RNTI, the RO is indicated in the response for the fall back. In some embodiments, the RO may be indicated for the BI if the response comprises multiple BIs. The number of bits needed for RO depends on the CR-RNTI designed to indicate the part of information not implied by the CR-RNTI. For example, if with current RA-RNTI and other inform indicated in DCI or RAR/messageB, RO field indicates the missing information. If with one common CR-RNTI for the first random access mode, RO field indicates which RO the preamble was transmitted. If with CR-RNTI uniquely indicates time domain information, RO only needs to indicate frequency domain information. The "11" in the field may be reserved or for contention resolution for the terminal devices with C-RNTI or indicate padding. Alternatively, padding can be indicated with "00" in the field with another bit following it indicating padding or BI.

The network device 420 transmits 515 the random access response (also referred to as "message B") to the user equipment 310-1. In some embodiments, the network device 420 may determine a physical downlink control channel for transmitting the random access response. The downlink control channel is scrambled with identity information.

The identity information may be common to requests received on different random access channels. Alternatively, the identity information may also be common to all requests received on the random access channels. In an example embodiment, one common specific RNTI, contention resolution RNTI (CR-RNTI) may be configured for transmitting the random access responses, instead of linking the response to the PRACH occasion where the preamble for first request is sent.

In some embodiments, the downlink control channel is scrambled with the CR-RNTI. In other embodiments, if the network device 420 knows the C-RNTI of the user equipment 310-1, the downlink control channel is scrambled with the C-RNTI.

The user equipment 410-1 monitors 520 the response to the first request on the downlink control channel which is scrambled with the identity information. The user equipment 410-1 may monitor the downlink control channel during a configured window time (for example, the contention resolution window).

The user equipment 410-1 determines 525 the random access mode for the random access procedure if the request indicates that the random access in the first random access mode fails. As mentioned above, the response may comprise a field to indicate whether the first random access mode is successful.

In some embodiments, the response may comprise the back-off indication, which means that the user equipment which does not successfully complete the random access to apply back off before next attempt. In this way, enabling/disabling of falling back to the second random access mode can be dynamically indicated in the response. The user equipment 110-1 may derive a random value between 0 and the back-off indication as its back-off value and compare the back-off value with a threshold value. The threshold value may be configurable via Radio Resource Control (RRC) signaling. If the back-off value is greater than the threshold value, it means that the resources for first random access mode are overloaded and longer delay will be introduced. The user equipment 110-1 may determine the second random access mode for accessing the random access.

Alternatively, if the back-off value is less than the threshold value, the user equipment 110-1 may select the first random access mode for the random access. In other embodiments, the response may comprise one back-off indication for the first random access mode and one back-off indication for the second random access mode. If the back-off value for the first random access mode is greater than the back-off for the second random access mode, the user equipment 110-1 may determine the second random access mode. If the derived back-off value for the first random access mode is smaller than the derived back-off for the slow mode, the user equipment 110-1 may determine the first random access mode.

In some embodiments, the response may indicate that the falling back to the second random access mode is needed. For example, if the field in the response shows "10," it means the falling back to the second random access mode is needed. The user equipment 110-1 may continue with msg3 transmission using the uplink grant indicated in the RAR and start contention resolution timer in the second random access mode.

In some embodiments, if the user equipment 410-1 determines that the response comprises a random access preamble identity for the first request and a random access channel occasion for the first request, the user equipment 410-1 determines that it needs to fall back to the second random access mode. The user equipment 410-1 may also obtain random access response payload for the second random access mode from the response.

The user equipment 410-1 transmits 530 the second request for the random access. The second request comprises a preamble for the selected mode. In this way, the user equipment is allowed to fall back to the second random access mode without further retry of the quick mode, thereby reducing overload and latency.

Figure 6:
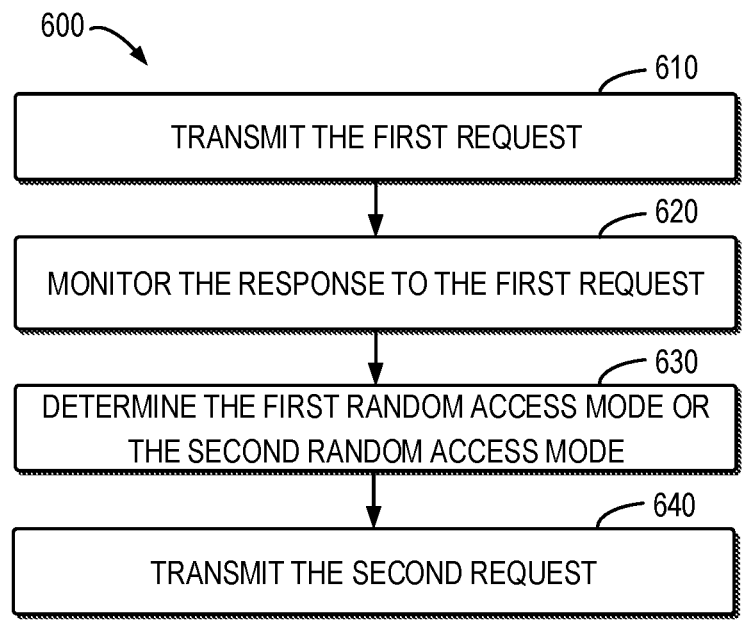
FIG. 6 illustrates a flow chart of a method implemented at a communication device according to embodiments of the present disclosure.

FIG. 6 illustrates a flow chart of a method 600 in accordance with embodiments of the present disclosure. The method 600 may be implemented at any suitable devices. Only for the purpose of illustrations, the method 600 is described to be implemented at the user equipment 410-1.

At block 610, the user equipment 410-1 transmits the first request (also referred to as "message A") for the random access procedure in the first random access mode to the network device 420. The first request comprises a first preamble for a first random access mode. The preamble is transmitted on a random access channel, for example, physical random access channel (PRACH). In some embodiments, the user equipment 410-1 may determine the PRACH and preamble based on predetermined configurations. For example, the user equipment 410-1 may be configured with information indicating PRACHs and/or preambles used for first random access mode.

In addition, the first request comprises identity information of the user equipment 310-1. The identity information may be transmitted on a physical uplink shared channel (PUSCH). In other embodiments, if the user equipment 410-1 has a cell radio network temporary identifier (C-RNTI), for example, the user equipment 410-1 may be in a connected mode, the identity information may be the C-RNTI. The request may comprise C-RNTI medium access control (MAC) control element (CE).

At block 620, the user equipment 410-1 monitors the response to the first request on the downlink control channel. The downlink control channel is scrambled with identity information. The identity information may be common to requests received on different random access channels. Alternatively, the identity information may also be common to all requests received on the random access channels. In an example embodiment, one common specific RNTI, contention resolution RNTI (CR-RNTI) may be configured for transmitting the random access responses, instead of linking the response to the PRACH occasion where the preamble for first request is sent.

In some embodiments, the downlink control channel is scrambled with the CR-RNTI. In other embodiments, if the network device 420 knows the C-RNTI of the user equipment 310-1, the downlink control channel is scrambled with the C-RNTI.

At block 630, the user equipment 410-1 determines the RA mode for the random access procedure if the request indicates that first request fails. In some embodiments, the response may comprise the back-off indication, which means that the user equipment does not successfully complete the random access in the first random access mode and needs to apply back off for its next attempt. In this way, enabling/disabling of falling back to the second random access mode can be dynamically indicated in the response. The user equipment 110-1 may derive a random value between 0 and the back-off indication as its back-off value and compare the back-off value with a threshold value. The threshold value may be configurable via Radio Resource Control (RRC) signaling. If the back-off value is greater than the threshold value, it means that the resources for first random access mode are overloaded and longer delay will be introduced. The user equipment 110-1 may determine the second random access mod for the random access.

Alternatively, if the back-off value is less than the threshold value, the user equipment 110-1 may determine the first random access mode for the random access procedure. In other embodiments, the response may comprise one back-off indication for the first random access mode and one back-off indication for the second random access mode. If the derived back-off value for the first random access mode is greater than the derived back-off for the second random access mode, the user equipment 110-1 may determine the second random access mode. If the back-off value for the first random access mode is smaller than the back-off for the slow mode, the user equipment 110-1 may determine the first random access mode.

In some embodiments, if the user equipment 410-1 determines that the response comprises a random access preamble identity for the first request and a random access channel occasion for the first request, the user equipment 410-1 determines that it needs to fall back to the second random access mode. The user equipment 410-1 may also obtain random access response payload for the second random access mode from the response.

At block 640, the user equipment 410-1 transmits the second request to the network device 420 for the random access procedure in the determined random access mode. The second request comprises a preamble for the selected mode. In this way, the user equipment is allowed to fall back to the second random access mode without further retry of the quick mode, thereby reducing overload and latency.

Figure 7:
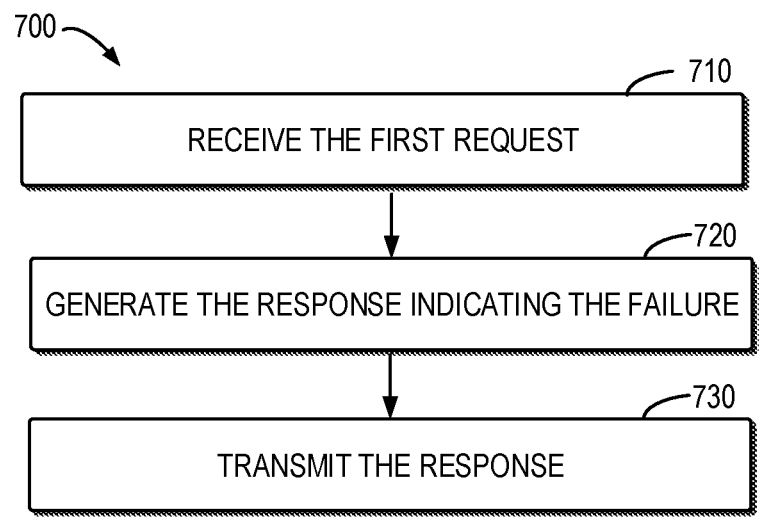
FIG. 7 illustrates a flow chart of a method implemented at a communication device according to embodiments of the present disclosure.

FIG. 7 illustrates a flow chart of a method 700 in accordance with embodiments of the present disclosure. The method 700 may be implemented at any suitable devices. Only for the purpose of illustrations, the method 700 is described to be implemented at the network device 420.

At block 710, the network device 420 receives the request for the random access procedure in the first random access mode. The request may comprise a first preamble for the first random access mode. The preamble is transmitted on a random access channel, for example, physical random access channel (PRACH). In some embodiments, the user equipment 410-1 may determine the PRACH and preamble based on predetermined configurations. For example, the user equipment 410-1 may be configured with information indicating PRACHs and/or preambles used for first random access mode.

In addition, the first request comprises identity information of the user equipment 410-1. The identity information may be transmitted on a physical uplink shared channel (PUSCH). In other embodiments, if the user equipment 410-1 has a cell radio network temporary identifier (C-RNTI), for example, the user equipment 410-1 may be in a connected mode, the identity information may be the C-RNTI. The request may comprise C-RNTI medium access control (MAC) control element (CE).

In some embodiments, at block 730, the network device 420 may obtain the identity information and the preamble from the request. The identity information may be used to scramble the physical downlink control channel. The preamble indicates that the random access is in the first random access mode.

The network device 420 may determine whether the request is successful based on the capacity of the random access channel. For example, if the random access channel is overloaded, the network device 420 may determine that the first random access mode fails.

At block 720, if the network device 420 determines that the request fails, the network device 420 generates the response indicating the failure. In some embodiments, the response to multiple terminal devices may be multiplexed into the same data unit. In this way, it avoids the user equipment monitoring both CR-RNTI for first random access mode and RA-RNTI for second random access mode. The response may comprise a field to indicate whether the first random access mode is successful. The response may comprise one of: an indication of back-off (Back-off Indicator), an indication of fall back response or an indication of contention resolution, or padding.

In some embodiments, the "00" in the field indicates that back-off indication follows 4 bits BI. The "01" in the field indicates contention resolution for UEs without C-RNTI follows: 12 bits timing advance (TA), 48 bits Contention resolution ID (common control channel, CCCH) and 16 bits allocated C-RNTI.

In some embodiments, the "10" in the field indicates fall back format follows: a random access preamble identity (RAPID) for the request, RACH Occasion (RO) (if not unique via RNTI) for the request, and random access response (RAR) payload for the second random access mode. If the RO is not uniquely indicated via the CR-RNTI, the RO is indicated in the response for the fall back. In some embodiments, the RO may be indicated for the BI if the response comprises multiple BIs. The number of bits needed for RO depends on the CR-RNTI designed to indicate the part of information not implied by the CR-RNTI. For example, if with current RA-RNTI and other inform indicated in DCI or RAR/messageB, RO field indicates the missing information. If with one common CR-RNTI for the first random access mode, RO field indicates which RO the preamble was transmitted. If with CR-RNTI uniquely indicates time domain information, RO only needs to indicate frequency domain information. The "11" in the field may be reserved or for contention resolution for the terminal devices with C-RNTI.

In some embodiments, network device 420 may indicate fall back indication for a certain Random Access Preamble Identity (RAPID) transmitted by the user equipment 410-1 as well as the contention resolution identity of the user equipment 410-1. Such case may happen, for instance, when two random access preambles map to the same data resource when terminal devices transmit the messageA/msgA and network device 420 is only able to decode one of the data resources transmitted by the terminal devices. Hence, in some embodiments, the contention resolution identities of the terminal devices are multiplexed before the fall back indications in the messageB/msgB by the network device 420. When the user equipment 410-1 decodes the received messageB/msgB, it will first find its contention resolution identity and can determine the first random access to be successful. In some embodiments, for example, if there is no fixed order of the contention resolution and fall back indication, the terminal devices ignores fall back indication if it finds its contention resolution identity.

At block 730, the network device 420 transmits the response to the first request. In some embodiments, the network device 420 may determine a physical downlink control channel for transmitting the random access response. The downlink control channel is scrambled with identity information.

The identity information may be common to requests received on different random access channels. Alternatively, the identity information may also be common to all requests received on the random access channels. In an example embodiment, one common specific RNTI, contention resolution RNTI (CR-RNTI) may be configured for transmitting the random access responses, instead of linking the response to the PRACH occasion where the preamble for first request is sent.

In some embodiments, the downlink control channel is scrambled with the CR-RNTI. In other embodiments, if the network device 420 knows the C-RNTI of the user equipment 310-1, the downlink control channel is scrambled with the C-RNTI.

In some embodiments, an apparatus for performing the method 600 (for example, the user equipment 410-1) may comprise respective means for performing the corresponding steps in the method 600. These means may be implemented in any suitable manners. For example, it can be implemented by circuitry or software modules.

In some embodiments, the apparatus comprises: means for transmitting, at a user equipment, a first request to a network device for a random access procedure in a first random access mode; means for monitoring a response to the first request on a downlink control channel; and means for n response to receiving the response indicating that the first request fails, determining the first random access mode or a second random access mode for the random access procedure; and means for transmitting a second request to the network for the random access procedure in the determined random access mode.

In some embodiments, the means for determining the first random access mode or a second random access mode for the random access channel comprises: means for in response to the response comprising an back-off indication, determining a back-off value for the first random access mode based on the back-off indication; means for comparing the back-off value with a threshold value; and means for in response to the back-off value exceeding the threshold value, determining the second random access mode for the random access procedure.

In some embodiments, the means for determining the first random access mode or a second random access mode for the random access channel comprises: means for in response to the response comprising an back-off indication, determining a back-off value based on the back-off indication; means for comparing the back-off value with a threshold value; and means for in response to the back-off value being below the threshold value, determining the first random access mode for the random access procedure.

In some embodiments, the means for determining the first random access mode or a second random access mode for the random access channel comprises: means for in response to the response comprising an back-off indication, determining based on the response a first back-off value for the first random access mode and a second back-off value for the second random access mode; means for comparing the first back-off value with the second back-off value; and means for in response to the first back-off value exceeding the second back-off value, determining the second random access mode for the random access procedure.

In some embodiments, the means for determining the first random access mode or a second random access mode for the random access channel comprises: means for in response to the response indicating the falling back to the second random access mode is needed, determining the second random access mode for the random access channel.

In some embodiments, the apparatus further comprises: means for in response to determining that the response comprising at least one of: a random access preamble identity for the first request and a random access channel occasion for the first request, obtain random access response payload for the second random access mode from the response.

In some embodiments, the identity information comprises a preamble and identity information of the user equipment, and the apparatus further comprise: means for in response to failing to find the identity information and/or identification of the first preamble in the response, determining the first random access mode fails.

In some embodiments, an apparatus for performing the method 700 (for example, the network device 120) may comprise respective means for performing the corresponding steps in the method 700. These means may be implemented in any suitable manners. For example, it can be implemented by circuitry or software modules.

In some embodiments, the apparatus comprises: means for receiving a request from a user equipment for a random access procedure; means for in response to determining that the request fails, generating a response indicating the failure, the response further comprising information on determining the first random access mode or a second random access mode by the user equipment; and means for transmitting the response to the request on a downlink control channel.

In some embodiments, the request comprises ate least one of an back-off indication, an indication of contention resolution, or an indication of the second random access mode.

In some embodiments, if the response comprises the indication of back-off value, the response further comprises at least one of: a first back-off value for the first random access mode, or a second back-off value for the second random access mode.

In some embodiments, if the response comprises the indication of contention resolution, the response further comprises at least one of: a timing advance for the terminal device, a contention resolution identity for the user equipment, a cell radio network temporary identifier for the user equipment, or a contention resolution cell radio network temporary identifier medium access control (MAC) control element for the user equipment.

In some embodiments, if the response comprises the indication of the second random access mode, the response further comprises at least one of: a random access preamble identity for the request, a random access channel occasion for the request, or random access response payload for the second random access mode.

In some embodiments, the apparatus further comprise: means for receiving, from a further user equipment, a further request for the random access procedure; means for generating a further response to the further request; and means for transmitting the response and the further response on the downlink control channel.

Figure 8:
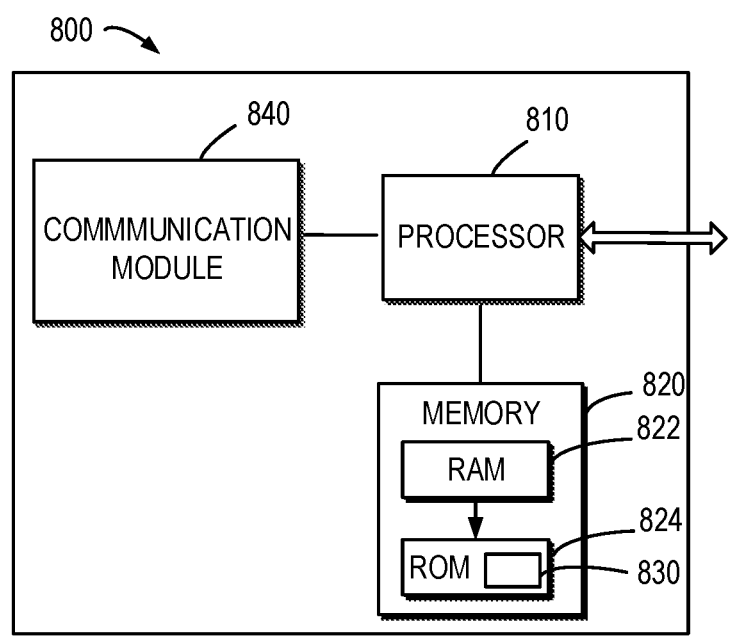
FIG. 8 illustrates a schematic diagram of a device according to embodiments of the present disclosure.
Figure 9:
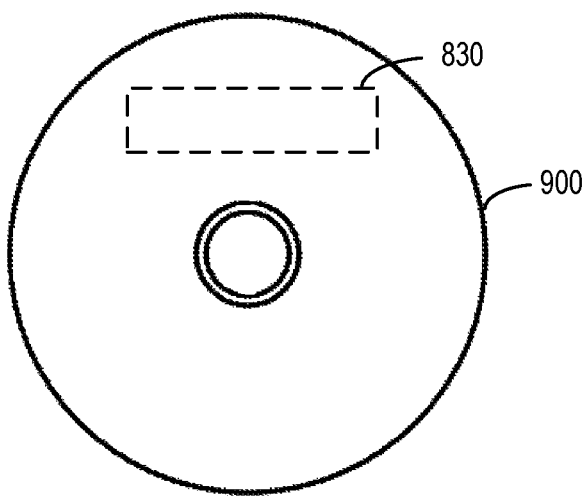
FIG. 9 shows a block diagram of an example computer readable medium in accordance with some embodiments of the present disclosure.

FIG. 8 is a simplified block diagram of a device 800 that is suitable for implementing embodiments of the present disclosure. The device 800 may be provided to implement the communication device, for example the network devices 120-1, 120-2 or the user equipment 110-1 as shown in FIG. 1. As shown, the device 800 includes one or more processors 810, one or more memories 820 coupled to the processor 810, and one or more communication module (for example, transmitters and/or receivers (TX/RX)) 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 2 to 6. The embodiments of the present disclosure may also be implemented by hardware or by a combination of software and hardware.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 8 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 600 as described above with reference to FIGS. 2-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus for communications comprising:
   at least one processor; and at least one memory including computer program codes;
the at least one memory and the computer program codes are configured to, with the at least one processor, cause the apparatus to:
  transmit a first request to a network device for a random access procedure in a first random access mode; and
  monitor a response to the first request on a downlink control channel,
  wherein the response comprises a first bit and a second bit, wherein the first bit indicates whether or not the apparatus is to switch to a second random access mode, and the second bit indicates, in the event that the first bit indicates not switching to the second random access mode, provision of a back-off value or provision of contention resolution information, and
  wherein the first random access mode is a quick mode compared to the second random access mode.

2. The apparatus of claim 1, wherein the contention resolution information comprises at least one of:
  a timing advance for the apparatus,
  a contention resolution identity for the apparatus,
  a cell radio network temporary identifier for the apparatus, or
  a contention resolution cell radio network temporary identifier medium access control control element for the apparatus.

3. The apparatus of claim 1, wherein the at least one memory and the computer program codes are further configured to, with the at least one processor, cause the apparatus to:
  in response to the second bit indicating the provision of a back-off value,
  compare the back-off value with a threshold value; and
  in response to the back-off value exceeding the threshold value, determine the second random access mode for the random access procedure.

4. The apparatus of claim 1, wherein the at least one memory and the computer program codes are further configured to, with the at least one processor, cause the apparatus to:
  in response to the second bit indicating the provision of a back-off value,
  compare the back-off value with a threshold value; and
  in response to the back-off value being below the threshold value, determine the first random access mode for the random access procedure.

5. The apparatus of claim 1, wherein the at least one memory and the computer program codes are further configured to, with the at least one processor, cause the apparatus to:
  in response to the second bit indicating the provision of a back-off value,
  compare the first back-off value for the first random access mode with a second back-off value for the second random access mode;
  in response to the first back-off value exceeding the second back-off value, determine the second random access mode for the random access procedure.

6. The apparatus of claim 3, wherein the at least one memory and the computer program codes are configured to, with the at least one processor, cause the apparatus to:
  in response to determining the second random access mode for the random access procedure, obtain random access response payload for the second random access mode from the response.

7. The apparatus of claim 1, wherein the at least one memory and the computer program codes are configured to, with the at least one processor, cause the apparatus to:
  in response to failing to find the identity information and/or identification of the first preamble in the response, determine the first request fails.

8. An apparatus for communications comprising:
at least one processor; and
at least one memory including computer program codes;
the at least one memory and the computer program codes are configured to, with the at least one processor, cause the apparatus device to:
  receive a request from a user equipment for a random access procedure in a first random access mode; and
  generate a response, wherein the response comprises a first bit and a second bit, wherein the first bit indicates whether or not the user equipment is to switch to a second random access mode, and the second bit indicates, in the event that the first bit indicates not switching to the second random access mode, provision of a back-off value or provision of contention resolution information, and
  wherein the first random access mode is a quick mode compared to the second random access mode.

9. The apparatus of claim 8, wherein, in response to determining that the request is successful, the at least one memory and the computer program codes are configured to, with the at least one processor, cause the apparatus to transmit the response comprising an indication of contention resolution.

10. The apparatus of claim 9, wherein the contention resolution information comprises at least one of:
  a timing advance for the user equipment,
  a contention resolution identity for the user equipment,
  a cell radio network temporary identifier for the user equipment, or
  a contention resolution cell radio network temporary identifier medium access control control element for the user equipment.

11. The apparatus of claim 8, wherein the second bit indicates the provision of a back-off value, and the response comprises at least one of:
  a first back-off indication for the first random access mode, or
  a second back-off indication for the second random access mode.

12. The apparatus of claim 8, wherein, in the event that the first bit indicates that the user equipment is to switch to a second random access mode, the response further comprises at least one of:
  a random access preamble identity for the request,
  a random access channel occasion for the request, or
  random access response payload for the second random access mode.

13. The apparatus of claim 8, wherein the at least one memory and the computer program codes are further configured to, with the at least one processor, cause the apparatus to:
  receive, from a further user equipment, a further request for the random access procedure;
  generate a further response to the further request; and
  transmit the response and the further response on a downlink control channel.

14. A method comprising:
  transmitting, at a user equipment, a first request to a network device for a random access procedure in a first random access mode; and monitoring a response to the first request on a downlink control channel,
wherein the response comprises a first bit and a second bit, wherein the first bit indicates whether or not the user equipment is to switch to a second random access mode, and the second bit indicates, in the event that the first bit indicates not switching to the second random access mode, provision of a back-off value or provision of contention resolution information, and
wherein the first random access mode is a quick mode compared to the second random access mode.

15. The method of claim 14, wherein the contention resolution information comprises at least one of:
a timing advance for the user equipment,
a contention resolution identity for the user equipment,
a cell radio network temporary identifier for the user equipment, or
a contention resolution cell radio network temporary identifier medium access control control element for the user equipment.

16. The method of claim 14, further comprising:
in response to the second bit indicating the provision of a back-off value, comparing the back-off value with a threshold value; and
in response to the back-off value exceeding the threshold value, determining the second random access mode for the random access procedure.

17. The method of claim 16, further comprising:
in response to determining the second random access mode for the random access procedure, obtaining random access response payload for the second random access mode from the response.

18. The method of claim 14, further comprising:
in response to the second bit indicating the provision of a back-off value, comparing the back-off value with a threshold value; and
in response to the back-off value being below the threshold value, determining the first random access mode for the random access procedure.

19. The method of claim 14, further comprising:
in response to the second bit indicating the provision of a back-off value, comparing the first back-off value for the first random access mode with a second back-off value for the second random access mode; and
in response to the first back-off value exceeding the second back-off value, determining the second random access mode for the random access procedure.

20. The method of claim 14, further comprising:
in response to failing to find the identity information and/or identification of the first preamble in the response, determining the first request fails.

\* \* \* \* \*